United States Patent [19]

Harman

[11] Patent Number: 5,483,394
[45] Date of Patent: Jan. 9, 1996

[54] FILTERED AVERAGE SERVO DEMODULATOR

[75] Inventor: Jefferson H. Harman, Thousand Oaks, Calif.

[73] Assignee: Wangtek, Inc., Simi Valley, Calif.

[21] Appl. No.: 146,369

[22] Filed: Oct. 29, 1993

[51] Int. Cl.$^6$ .............................. G11B 5/584; G11B 5/55
[52] U.S. Cl. .................................. 360/77.12; 360/78.02; 360/9.1; 360/23
[58] Field of Search ............................ 360/10.3, 66, 67, 360/70, 77.01, 77.02, 77.03, 77.15, 77.16, 77.12, 9.1, 23, 78.02, 77.08; 395/425

[56] References Cited

U.S. PATENT DOCUMENTS

| | | | |
|---|---|---|---|
| 3,732,546 | 5/1973 | Ronkin et al. | 345/425 |
| 3,943,565 | 3/1976 | Frank et al. | 360/70 |
| 4,270,073 | 5/1981 | Harman | 360/77.03 X |
| 4,300,174 | 11/1981 | Harman et al. | 360/66 X |
| 4,306,257 | 12/1981 | Harman | 360/67 |
| 4,318,141 | 3/1982 | Haynes | 360/77.01 |
| 4,384,309 | 5/1983 | Perahia | 360/77.02 |
| 4,485,414 | 11/1984 | Baker | 360/10.3 |
| 5,050,018 | 9/1991 | Georgis et al. | 360/77.16 |
| 5,119,249 | 6/1992 | Uchikoshi | 360/77.15 |
| 5,229,895 | 7/1993 | Schwarz et al. | 360/77.08 X |

OTHER PUBLICATIONS

3M Company, M. Hamerly—Review Copy—Requirement Specification Jul. 16, 1991 M4/G2 Servo Analog Front End.
3M Company—QIC Development Standard: Unformatted Servo–Written Jun. 4, 1992 Magnetic Tape Cartridge For Information Interchange.

QIC Committee Study—Servo Considerations For the Advanced Generation 1989 of QIC Drives.

Hewlett-Packard—Testing the Servo Channel—pp. 21–25 1989.

IBM J. Res. Develop., —Design of a Disk File Head—pp. 506–512 Nov. 1974 R. K. Oswald Positioning Servo.

*Primary Examiner*—Aristotelis Psitos
*Assistant Examiner*—Patrick Wamsley
*Attorney, Agent, or Firm*—Robbins, Berliner and Carson

[57] ABSTRACT

A track following positioning system including filtered average servo demodulators for maintaining the position of a magnetic tape head in alignment with tracks of data stored in magnetic medium. A servo head tracks a centerline in a servo written region of the magnetic medium and generates servo head signals corresponding to the displacement of the servo head from the centerline. A filtered average servo demodulator detects the servo head signals and generates servo error signals for realigning the tape head with respect to the magnetic medium in response thereto. To generate servo error signals, the filtered average servo demodulator peak detects and averages the rectified and filtered output signals and then subtracts a proportion of the peak detected signals from the average detected signals.

47 Claims, 9 Drawing Sheets

FILTERED AVERAGE SERVO DEMODULATOR

BACKGROUND OF THE INVENTION

1. Field of the Invention

The present invention relates generally to track following positioning systems, and more particularly to systems for demodulating servo signals within an amplitude modulation track following servo environment.

2. Description of the Prior Art

Digital data are conventionally stored on magnetic medium in the form of flux transitions on the surface of the medium. Data recovery consists of determining the presence, and relative timing, of such flux transitions. Optimal operation of a recording device therefore depends upon the proper orientation and position of the magnetic head. Otherwise, the use of an improperly oriented and positioned recording head may result in the information being recorded in a manner that cannot be accurately retrieved on playback. Similarly, an improperly oriented or positioned playback head may result in the inaccurate retrieval of information even if the information was properly recorded. In either case, the integrity of the information storage system may be compromised and information may be lost.

Furthermore, as the density of the storage of digital information on magnetic surfaces continues to increase, it has become more difficult to accurately and reliably determine the presence or absence of such flux transitions. Track density is typically increased through the use of narrower track widths, closer track spacing, or both. As a result, there is very little tolerance for error in the orientation and position of the magnetic head within the recorder.

Recently, positioning systems employing amplitude modulation (AM), such as the positioning system employed by 3M of Minneapolis, Minn. utilizing Magnus 10.3 tapes, have been used to maintain the position of a magnetic tape head in alignment with tracks of data stored in magnetic medium. The tape head is aligned on-track when it is positioned at a desired location on the tape.

Regardless of the method used for writing position sensitive information (servo information) on the tape, information can be corrupted, or even destroyed, by impulse noise, dropouts, or amplitude modulation noise. Impulse noise can be generated by fast transitions from logic elements and other fast switching circuits coupling into the read head for servo. Dropouts are due to manufacturing imperfections and wear to the tape. Amplitude modulation noise can come from variations in head to tape contact. A special case of this is magnetic-resistive (MR) thermal noise generated by sudden cooling of the MR element in the MR head as it comes into more intimate contact with the tape. MR thermal noise causes simultaneous impulse and amplitude modulation noise. MR thermal noise is likely to occur at higher frequencies than the tape wander that the track following positioning system tracks.

What is needed is a track following positioning system that generates reliable servo error signals for accurate head positioning and that is tolerant to impulse noise, dropouts, and amplitude modulation noise.

SUMMARY OF THE INVENTION

The preceding ad other shortcomings of prior art systems are addressed and overcome by the present invention that provides, in a first aspect, a robust track following positioning system for maintaining alignment of a read or write head to the medium in a magnetic tape drive. One of several, three in the preferred embodiment, read heads in the same gap line is selected as a servo head and is used to read the AM servo information written on the tape. The output of this head is processed in a unique manner to be described, in order to generate a servo error signal which, when used in a closed loop servo system, will accurately position all of the heads in the aforementioned gap line. In order to obtain the maximum number of data tracks for a given number of servo tracks, each of the three read heads will be at times selected as the servo head, and positioned over the AM servo information in order to read that information. At the track center location in the AM servo, a predetermined amount of AM, 50% in the preferred embodiment, will result. Even small displacements from track center will change this modulation percentage; causing an increased modulation for one direction of displacement and decreased modulation for the other. Thus this variation in modulation is continuously representative of the amount and direction of displacement from track center.

Thus, the track following positioning system provides servo head means operatively connected to the tape head for generating servo head output signals in response to the displacement of the servo head means from an on-track location on a servo written region of magnetic medium when the magnetic media is moved. Additionally, the track following positioning system provides demodulator means for generating servo error signals in response to the servo head output signals generated by the servo head means indicating misalignment of the servo head means from the on-track location, and means for positioning the tape head on the magnetic medium in accordance with the servo error signals.

The demodulator means provides means for generating rectified and filtered signals having values related to the servo head output signals, means for generating reference signals in response to the rectified and filtered signals, means for generating averaged signals related to position of the read head means over the servo written region on the magnetic medium in response to the rectified and filtered signals, and means for subtracting the reference signals from the averaged signals to generate the servo error signals.

In another aspect, the present invention provides a method of maintaining alignment of a tape head on magnetic medium by generating servo head output signals in response to displacement of a servo head means operatively connected to the tape head from an on-track location on a servo written region of magnetic medium when the magnetic medium is moved in a first direction, generating servo error signals in response to the servo head output signals generated by the servo head means indicating misalignment of the servo head means from the on-track location, and positioning the tape head on the magnetic medium in accordance with the servo error signals.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
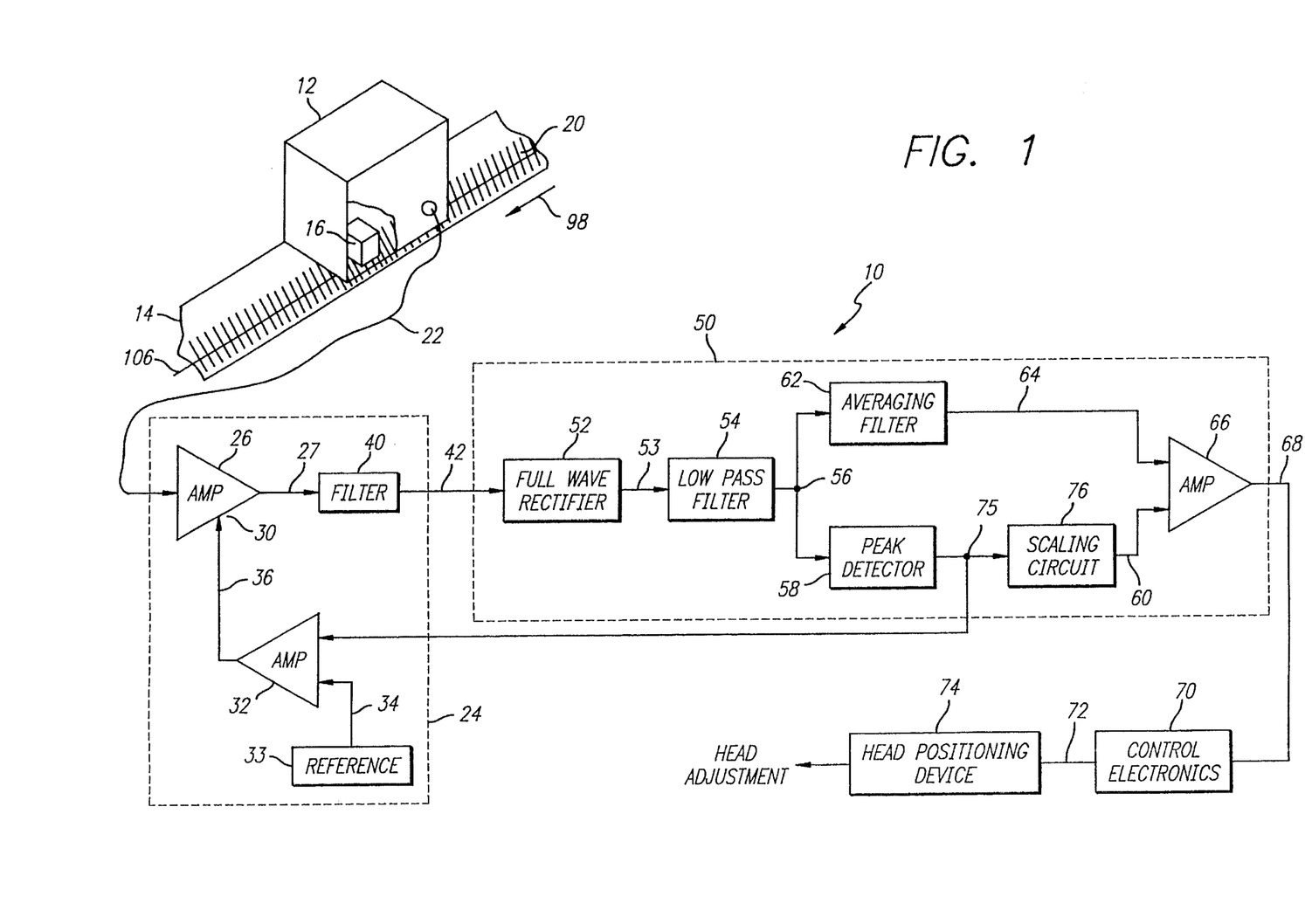
FIG. 1 is a diagram of a track following positioning system including a filtered average servo demodulator in accordance with the present invention.

FIG. 1 is a block diagram of a track following positioning system 10 for maintaining alignment of tape head assembly 12 with magnetic medium 14. Track following positioning system 10 operates with tape head assembly 12, magnetic medium 14, automatic gain control circuit 24, filtered average servo demodulator 50, control electronics 70 and head positioning device 74.

Tape head assembly 12 typically includes a plurality of read heads. One of several, three in the preferred embodiment, read heads in the same gap line is selected as a servo head and is used to read AM servo information written on magnetic medium 14. As shown in FIG. 1, the selected read head is servo head 16. The output of servo head 16, servo head signal 22, is then uniquely processed to generate servo error signal 68 which, when used in a closed loop servo system, will accurately position all of the read heads in the aforementioned gap line. In order to obtain the maximum number of data tracks for a given number of servo tracks, each of the three read heads will be at times selected as the servo head, and positioned over the AM servo information in order to read that information. At the track center location, a predetermined amount of AM, 50% in the preferred embodiment, will result. Even small displacements from track center will change this modulation percentage; causing an increased modulation for one direction of displacement and a decreased modulation for the other. Thus this variation in modulation is continuously representative of the amount and direction of displacement from track center.

In particular, servo head 16 tracks an on-track position, such as centerline 106, in servowritten portions 20 of magnetic medium 14 and generates servo head signal 22 corresponding to the displacement of servo head 16 from centerline 106. Magnetic medium 14 may be a magnetic tape, diskette or other magnetic medium.

Servo head signal 22 is applied to automatic gain control circuit 24 to maintain amplified signal 42 at a constant peak amplitude. Amplified signal 42 is then applied to filtered average servo demodulator 50 for generating servo error signal 68 which, when used in a closed loop servo system, will accurately position all of the read heads in the aforementioned gap line. Filtered average servo demodulator 50, described in detail below, generates servo error signals 68 indicating direction and magnitude of displacement of servo head 16 from centerline 106 of magnetic medium 14. Control electronics 70 receive servo error signals 68 from filtered average servo demodulator 50 and provides control signals 72 to head positioning device 74. In the preferred embodiment, head positioning device 74 is implemented by a step motor in microstep mode used in combination with a micro-positioner. Head positioning device 74 moves tape head assembly 12 in either a first or second transverse direction, typically orthogonal, to motion of magnetic medium 14.

Figure 2A:
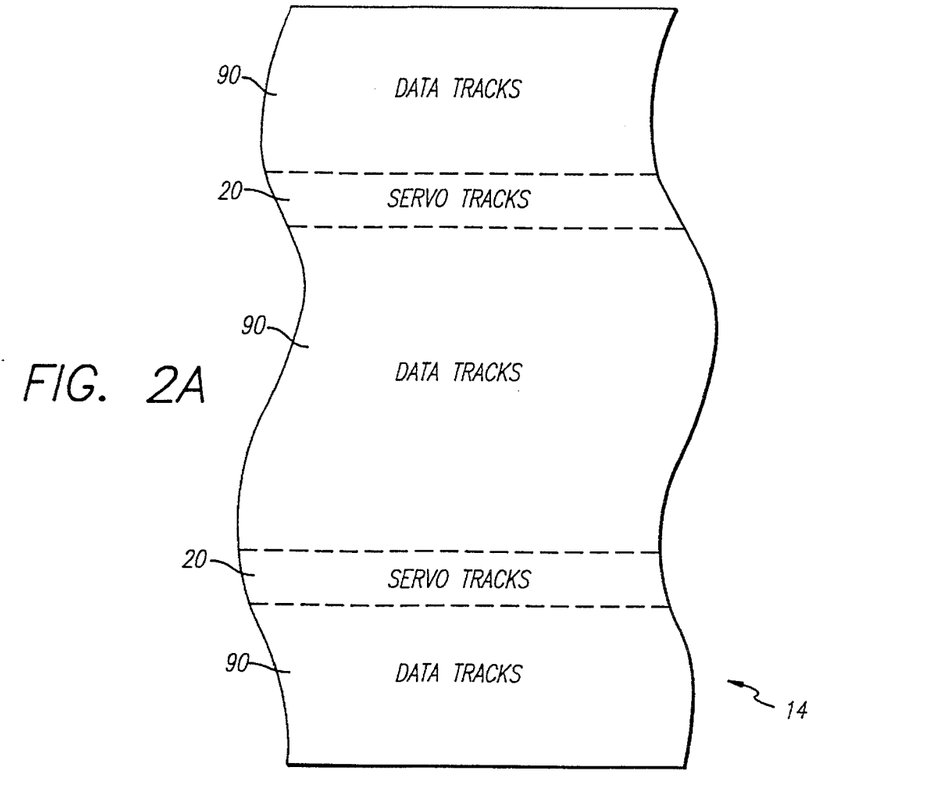
FIG. 2A is a diagram of a typical physical track layout of magnetic medium shown in FIG. 1.

FIG. 2A is a diagram of a typical physical track layout of magnetic medium 14 shown in FIG. 1 capable of high storage capacity. Data tracks 90 are written in parallel as track sets with each track set consisting of two physical tracks. Servowritten portions 20 are typically split into two bands of 12 servo tracks each and are written in accordance with existing technology, such as technology provided by 3M of Minneapolis, Minn.

Figure 2B:
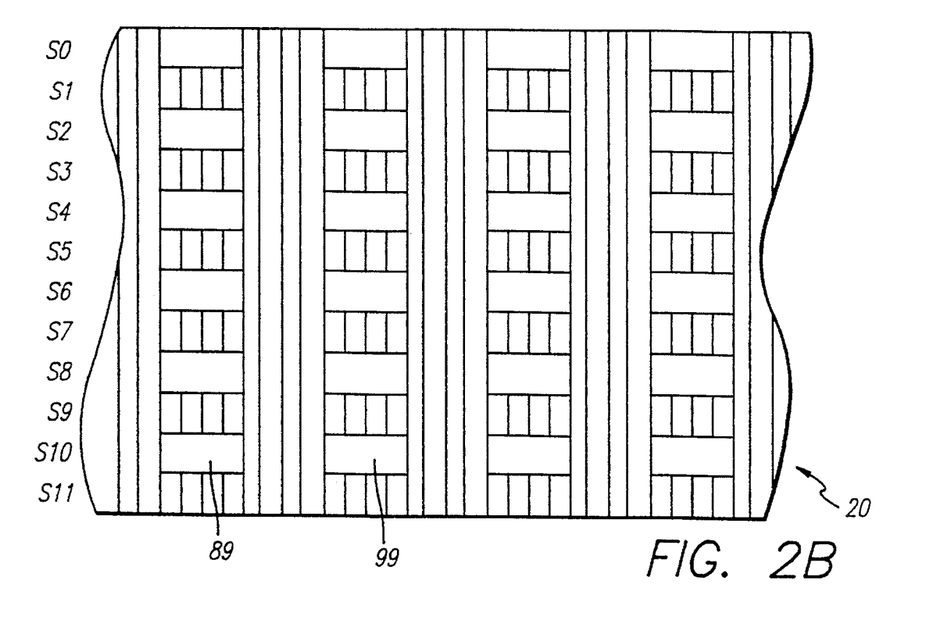
FIG. 2B is a detailed representation of the servowritten portion of the magnetic medium shown in FIG. 2A.

The present invention can be implemented using prewritten servo written tapes, such as experimental model Magnus 10.3 tapes provided by 3M, shown in FIG. 2B. FIG. 2B is a detailed representation of one band of servowritten portions 20 of the magnetic medium shown in FIG. 2A. As shown in FIG. 2B, each servo band recording will consist of a 12 track spacing wide recording at a predetermined servo frequency. These recordings will have a series of flux transitions and erased sections, such as erased sections 89 and 99. Each erased section is 1 track spacing wide and separated by the next erased section by 1 track spacing.

Figure 3A:
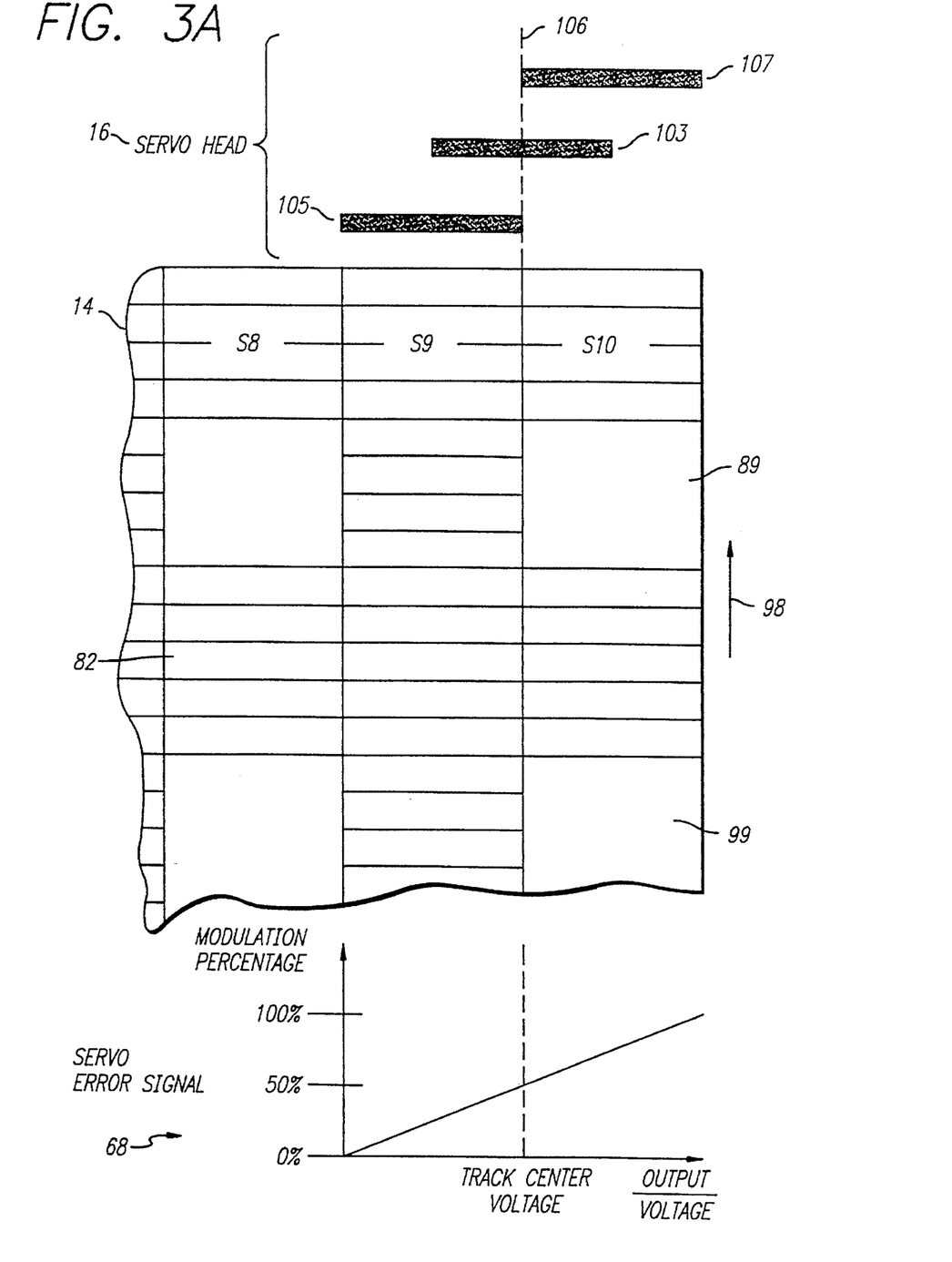
FIG. 3A is a pictorial illustration of servo flux reversals on the magnetic medium being sensed by a forward servo head at three different locations with respect to the flux reversals, and a graph of output voltage versus modulation percentage created by the displacement of the forward servo head with respect to the flux reversals.

The servo error signal 68 will be derived from a reverse servo head when reading reverse, a forward servo head when reading forward and from the average of both signals when writing. Referring now to FIG. 3A, the servowritten portions 20 shown in FIG. 2A and 2B and described above is read by a read head, such as servo head 16 located on tape head assembly 12 (not shown) with magnetic medium 14 moving in the forward direction as indicated by forward direction arrow 98. The output of tape head assembly 12 resulting from the off-track position of servo head 16 servo head signal 22, is used in filtered average servo demodulator 50, as shown in FIG. 1, for generating servo error signals 58 for repositioning tape head assembly so that it more accurately straddles centerline 106. Servo head 16 is aligned at a 90 degree angle to be parallel with the flux transitions in the servo data tracks. For example, during forward motion, servo head 16 is used to track the line between a pair of servo tracks, such as centerline 106 at the border between servo track S9 and S10.

Figure 4:
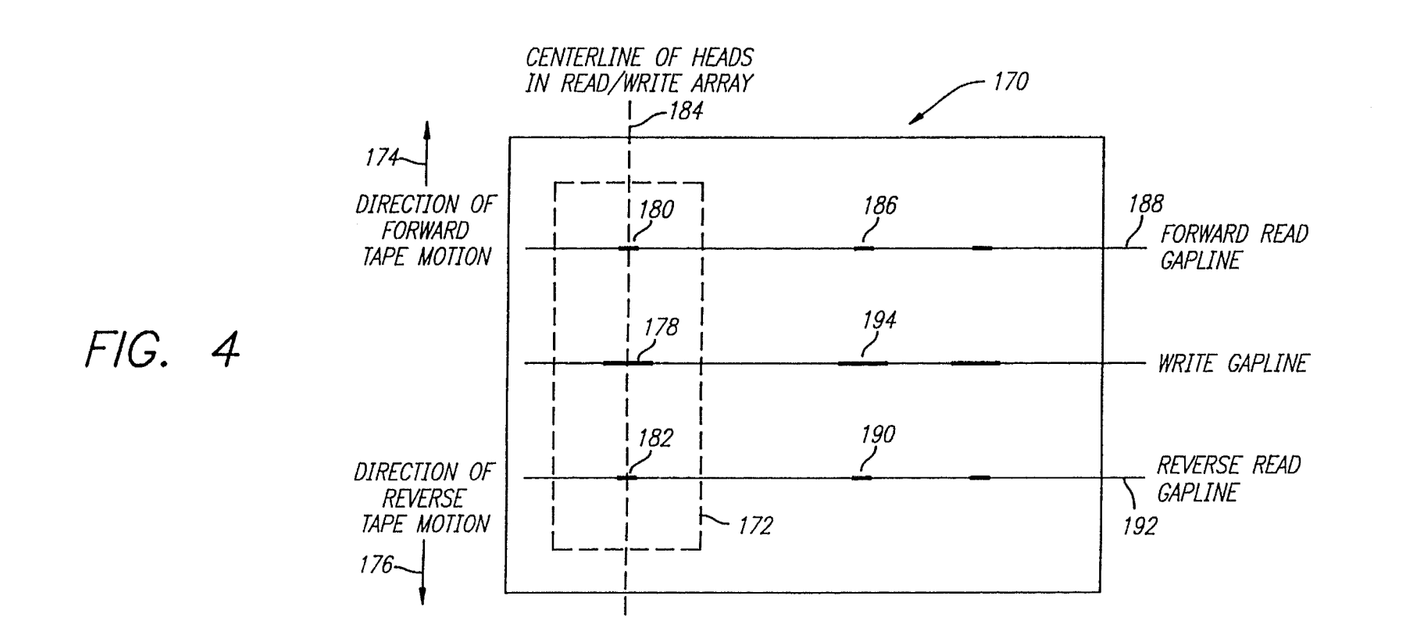
FIG. 4 is a diagram of a read/write head surface contacting the magnetic medium shown in FIG. 1.

In the tape drive used in the preferred embodiment, a read after write capability is desired; this gives the ability to check that just written data was written without error. Read after write means reading the just written data on a track while the write process is still in progress on that track. To accomplish this, it is necessary to have separate read and write heads arranged so that the tape passes under the read head just after it has passed under the write head. Also, it is desired in the preferred embodiment that the drive be capable of such read after write operation in both directions of tape motion. These requirements dictate that the head array be of either a design with two write heads and one read head sandwiched between, all having their centers substantially in alignment parallel to the direction of tape motion; or conversely, a write head similarly sandwiched between two read heads, as shown in FIG. 4. FIG. 4 is a diagram of a read/write head surface 170 for contacting magnetic medium such as magnetic media shown in FIG. 1. Read/write array 172 allows for read after write on a particular track in both the forward direction, as indicated by forward direction arrow 174, and the reverse direction, as indicated by reverse direction arrow 176. Read/write array 172 is designed with write head 178 sandwiched between forward read head 180 and reverse read head 182. Write head 178, forward read head 180 and reverse read head 182 are all aligned along centerline 184, parallel to the direction of tape motion. In order to eliminate errors due to inaccuracy in the alignment of the line containing the centers of the three heads in such an array, it is desirable that the servo head and the active read head be in the same gap line. Therefore, it is desirable to use a head, such as read head 186, in the forward gap line 188 as the servo head when reading with another head, such as read head 186, in the same forward gap line 188, and to servo with a head, such as read head 190, in the same reverse gap line 192 when reading with another head, such as read head 182, in the reverse gap line 192. When writing, and using a write head that is not capable of reading, the best positioning accuracy will result from servoing to the average of the two servo read heads, such as read heads 186 and 190, in alignment with the idle write head 194 over the servo area. Referring to FIG. 3A, servo head 16 reads the servo data in servo tracks S9 and S10 to maintain the position of tape head assembly 12 at centerline 106, the forward on-track location. In operation, when servo head 16 is at location 103, centered over centerline 106 at the border between servo tracks S9 and S10 (centered over the edge of hole 89 or 99), the output of filtered average servo demodulator 50 is servo error signal 68 with 50% square wave modulation. If tape head assembly 12 moves off-track, so that servo head 16 is positioned more over servo track S9 than servo track S10 (orthogonal to tape motion into transition region 82), the output of filtered average servo demodulator 50 is servo error signal 68 with less than 50% square wave modulation. Tape head assembly 12 is extreme off-track when servo head 16 is at location 105, positioned completely within servo track S9 (within transition region 82). The output of filtered average servo demodulator 50 is servo error signal 68 with 0% square wave modulation. If tape head assembly 12 moves off-track in the other direction, so that servo head 16 is positioned more over servo track S10 than servo track S9 (orthogonal to tape motion into hole 89 or 99), the output of filtered average servo demodulator 50 is servo error signal 68 with greater than 50% square wave modulation. Tape head assembly 12 is extreme off-track in the other direction when servo head 16 is at location 107, positioned completely within servo track S10. The output of filtered average servo demodulator 50 is servo error signal 68 with 100% square wave modulation.

Figure 3B:
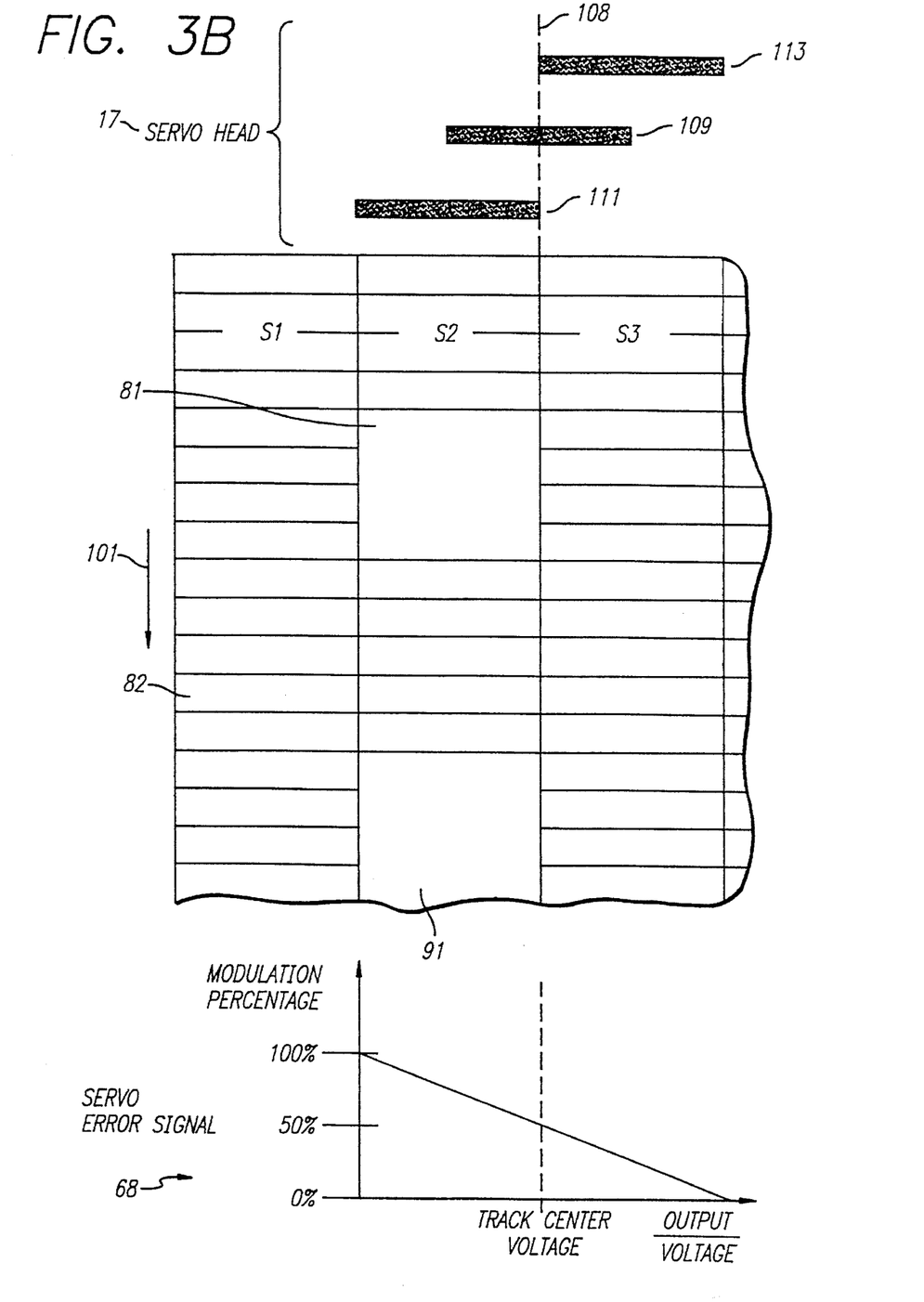
FIG. 3B is a pictorial illustration of servo flux reversals on the magnetic medium being sensed by a reverse servo head at three different locations with respect to the flux reversals, and a graph of output voltage versus modulation percentage created by the displacement of the reverse servo head with respect to the flux reversals.

In operation in another mode, such as in the reverse tape direction as indicated by reverse direction arrow 101 shown in FIG. 3B, the output of tape head assembly 12 resulting from the off-track position of servo head 17, servo head signal 22, is used in filtered average servo demodulator 50, as shown in FIG. 1, for generating servo error signals 68 for repositioning tape head assembly 12 so that it more accurately straddles centerline 108. For example, servo head 17 reads the servo data from servo tracks S2 and S3 to maintain the position of tape head assembly 12 at centerline 108, the reverse on-track location. In operation, when servo head 17 is at location 109, centered over centerline 108 at the border between servo tracks S2 and S3 (centered over the edge of hole 81 or 91), the output of filtered average servo demodulator 50 is servo error signal 68 with 50% square wave modulation. If tape head assembly 12 moves off-track, so that servo head 17 is positioned more over servo track S2 than servo track S3 (orthogonal to tape motion into hole 81 or 91), the output of filtered average servo demodulator 50 is servo error signal 68 with greater than 50% square wave modulation. Tape head assembly 12 is extreme off-track when servo head 17 is at location 111, positioned completely within servo track S2. The output of filtered average servo demodulator 50 is servo error signal 68 with 100% square wave modulation. If tape head assembly 12 moves off-track in the other direction, so that servo head 17 is positioned more over servo track S3 than servo track S2 (orthogonal to tape motion into transition region 82), the output of filtered average servo demodulator 50 is servo error signal 68 with less than 50% square wave modulation. Tape head assembly 12 is extreme off-track in the other direction when servo head 17 is at location 113, positioned completely within servo track S3 (within transition region 82). The output of filtered average servo demodulator 50 is servo error signal 68 with 0% square wave modulation.

Figure 8:
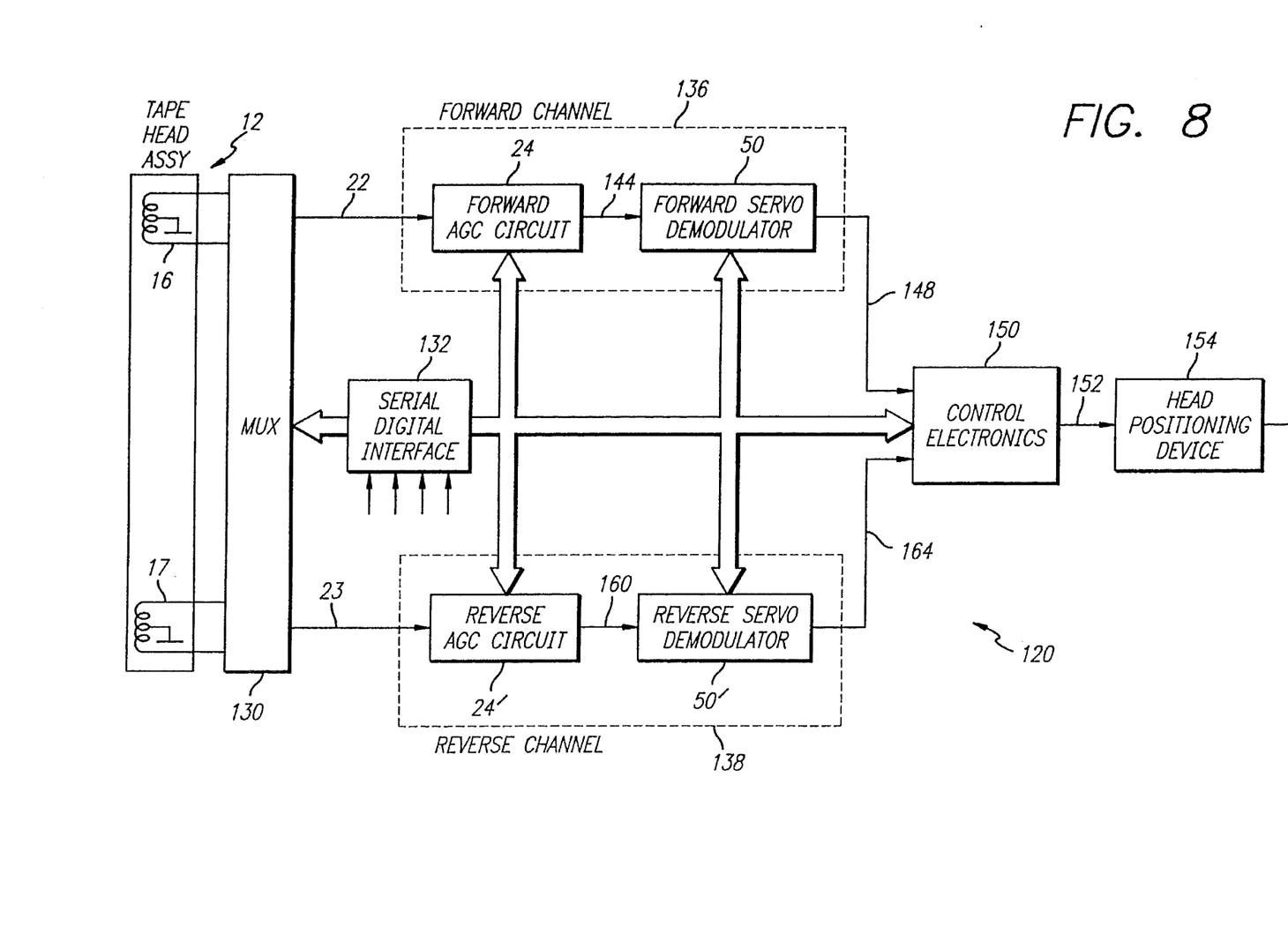
FIG. 8 is a block diagram of a track following positioning system including a filtered average servo demodulator consisting of two servo demodulator channels according to another embodiment of the invention.

The present invention may be used in other formats and is not intended to be restricted to the forward-reverse format shown. FIG. 1 shows a single channel track following positioning system 10 operating in the forward mode. FIG. 8 shows a multiple channel track following positioning system 120 operating in the forward and reverse mode. Although either forward servo head 16 or reverse servo head 17, or both, could be used for servoing in the single channel configuration shown in FIG. 1, for illustrative purposes, the following discussion will assume operation of forward servo head 16.

As shown in FIG. 1, servo written portions 20 on magnetic medium 14, formatted as shown in FIG. 2B and described above, is read by servo head 16 located on tape head assembly 12. Magnetic medium 14 moves in the forward direction as indicated by forward direction arrow 98. During forward motion, servo head 16 tracks a line between a pair of servo tracks on servo written portions 20, such as centerline 106. The output of tape head assembly 12 resulting from the position of servo head 16 is servo head signal 22. In accordance with the present invention, servo head signal 22 is used in track following positioning system 10 to reposition tape head assembly 12 so that it more accurately straddles centerline 106.

Servo head signal 22 is provided to automatic gain control circuit 24. Automatic gain control circuit 24 includes controllable gain amplifier 26, differential amplifier 32 and a filter, such as bandpass filter 40. Servo head signal 22 is initially applied to controllable gain amplifier 26 in automatic gain control circuit 24. Controllable gain amplifier 26 maintains amplitude modulated signal 42 at a constant peak amplitude. The gain applied to gain control element 30 of controllable gain amplifier 26 is controlled by the difference between amplitude reference signal 34 and peak detected signal 75 provided by peak detector 58. The difference, error signal 36, is generated by differential amplifier 32 and is applied to the gain control element 30 of controllable gain amplifier 26. Amplitude reference signal 34 is generated by reference generator 33, typically a voltage source.

The output of controllable gain amplifier 26, amplitude modulated signal 27, is a carrier at a frequency determined by the flux transition rate in the servo information. This carrier is amplitude modulated by the reduction in signal caused by servo head 16 passing over a portion of the hole which was erased into the servo data during the servowriting process. The modulation envelope is essentially a square wave at the frequency of the holes; the modulation percentage is determined by how much of the hole passes under the servo head. Amplitude modulated signal 27 is inevitably corrupted by interference and noise which will be present in the system.

Amplitude modulation produces a spectrum which contains the carrier frequency, and sidebands at frequencies equal to the sum (upper sideband) and difference (lower sideband) of the carrier frequency with the frequencies which are components of the modulating signal. Therefore an amplitude modulated signal may be separated from interference and noise at frequencies which are not close to the carrier by passing the amplitude modulated signal through a bandpass filter; this filter should be essentially centered on the carrier frequency and have a passband sufficient to pass only the sidebands of the modulation.

An ideal square wave has a spectrum containing the fundamental frequency, and all odd multiples of this fundamental (odd harmonics). The amplitude of each harmonic is proportional to the reciprocal of the ratio of its frequency to that of the fundamental; therefore a practical square wave can contain only a few harmonics. When a carrier is amplitude modulated by a square wave, upper and lower sidebands are generated by each of the harmonics in that waveform. In the preferred embodiment, sidebands generated by only the fundamental, third and fifth harmonic are passed by filter 40; this gives a sufficiently faithful square wave envelope and rejects most of the noise and interference in the system.

Figure 5A:
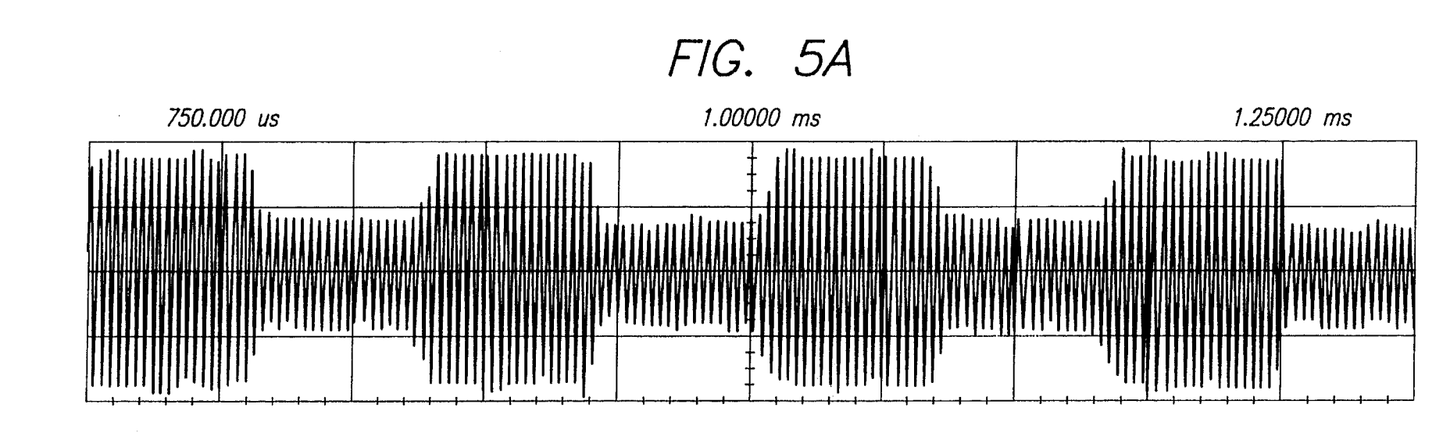
FIG. 5A is an oscilloscope trace showing an output of automatic gain control circuit shown in FIG. 1 at near 50% modulation.
Figure 5B:
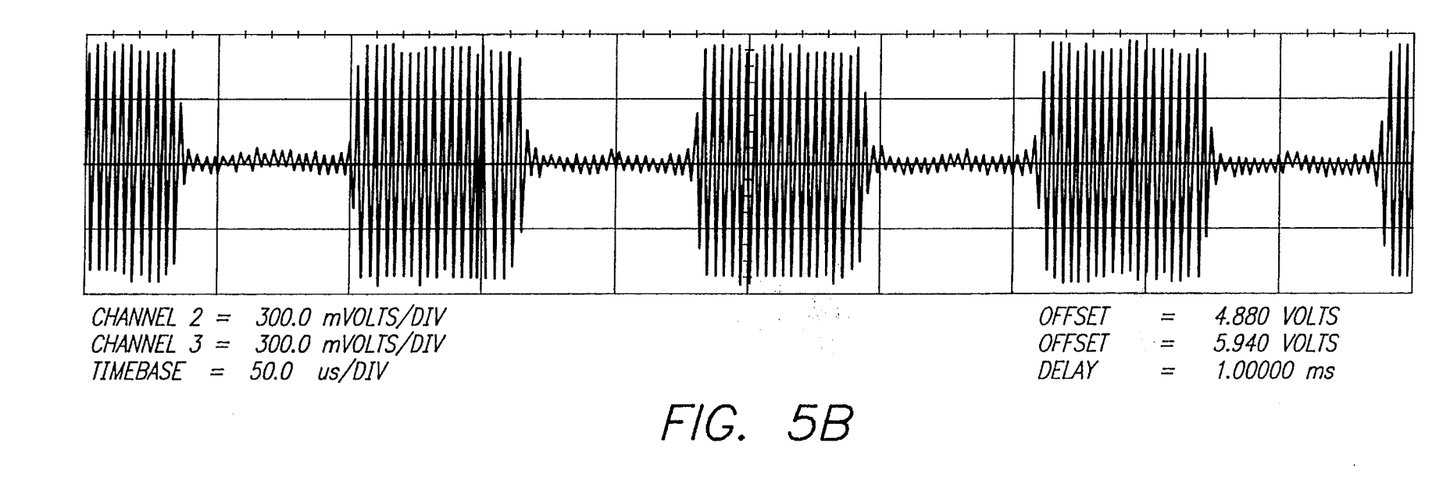
FIG. 5B is an oscilloscope trace showing an output of automatic gain control circuit shown in FIG. 1 at near 100% modulation.

The output of controllable gain amplifier 26, amplitude modulated signal 27, is applied to bandpass filter 40. The output of bandpass filter 40, amplified signal 42, is applied to filtered average servo demodulator 50. FIG. 5A is an oscilloscope trace of amplified signal 42 at near 50% modulation. FIG. 5B is an oscilloscope trace of amplified signal 42 near 100% modulation.

Filtered average servo demodulator 50 includes rectifier 52, lowpass filter 54, peak detector 58, scaling circuit 76, averaging filter 62, and summing amplifier 66. Amplified signal 42 is applied to rectifier 52, preferably a full-wave rectifier, to generate a rectified voltage signal 53 having an average output voltage proportional to the amplitude of amplified signal 42. Rectified voltage signal 53 is applied to lowpass filter 54 to generate a filtered rectified output 56.

Figure 6:
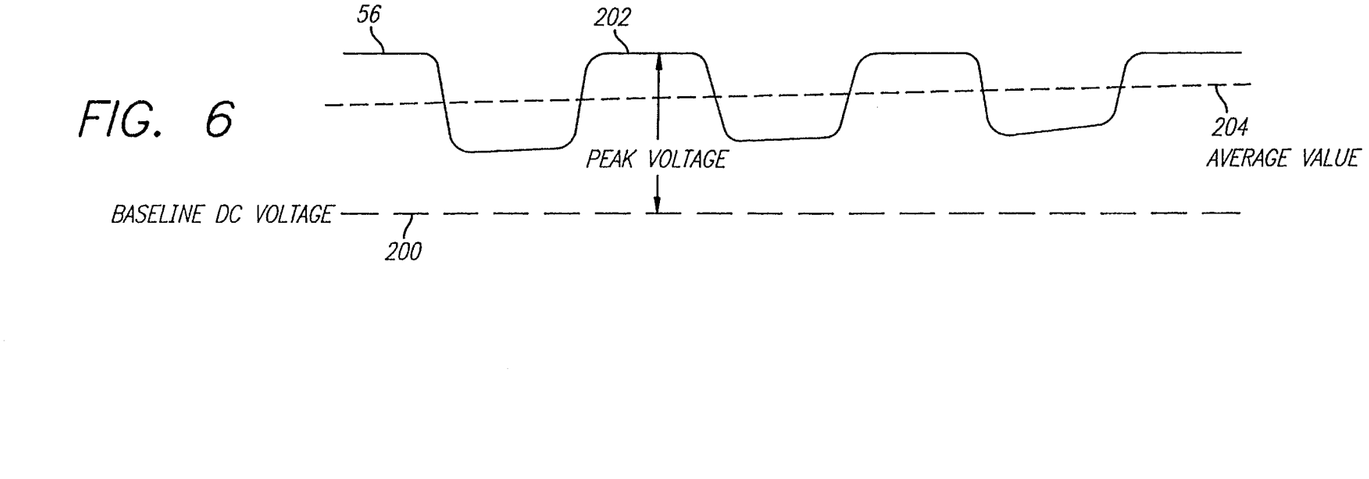
FIG. 6 is a detailed illustration of the filtered rectified output signal shown in FIG. 1.

Lowpass filter 54 functions as an averaging filter, having a cutoff frequency sufficiently high to pass a practical square wave at the modulation frequency but low enough to sufficiently remove ripple resulting from the rectified carrier. Lowpass filter 54 should reduce ripple and adequately pass the modulation frequency. Filtered rectified output 56, shown in detail in FIG. 6, is a square wave offset from a baseline DC voltage 200 that corresponds to the no signal condition. For convenience, the baseline voltage will be considered to be at zero volts. The peak voltage 202 corresponds to the amplitude of the servo signal between holes. Therefore, the magnitude of the peak voltage serves as an amplitude reference. At 100% modulation, the square wave will transition between zero and maximum. To obtain the amplitude reference in the present invention, filtered rectified output 56 is applied to peak detector 58.

Figure 7:
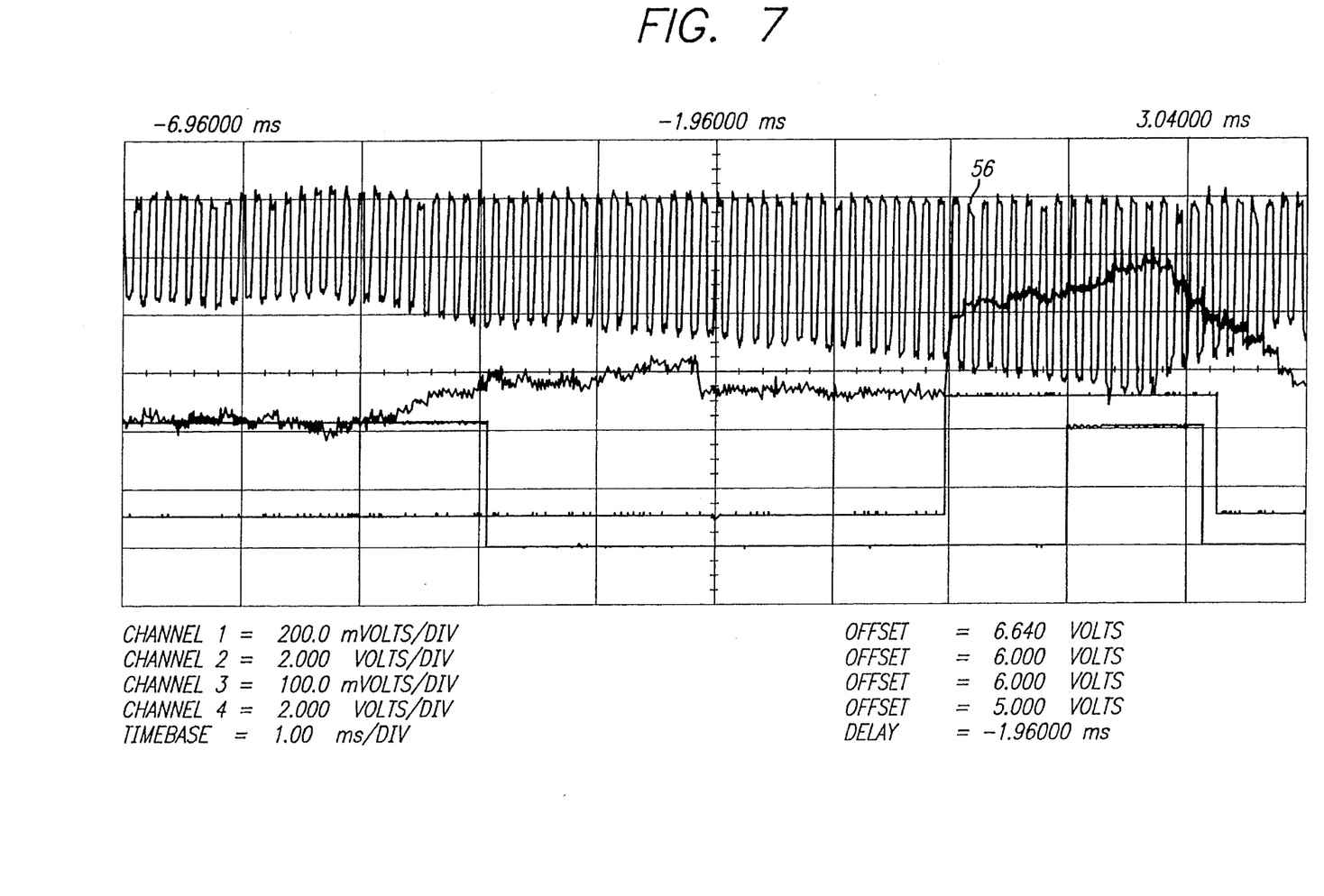
FIG. 7 is an oscilloscope trace showing the filtered rectified output signal shown in FIG. 1 and FIG. 6.

When the filtered rectified output 56 is symmetrical in time, the average value 204 of its voltage is one-half the sum of the most positive and most negative voltages. Thus, at 50% modulation, the average value is ¾ the maximum. FIG. 7 is an oscilloscope trace of filtered rectified output 56 shown in FIG. 1 and FIG. 6. Referring to FIG. 1, summing amplifier 66 subtracts ¾ scaled peak reference signal 60 from average detected signal 68 to generate servo error signal 68.

In operation, filtered rectified output 56 is applied to peak detector 58 and averaging filter 62. The output of peak detector 58, peak detected signal 75, is applied to a scaling circuit 76, typically a voltage divider circuit for scaling peak detected signal 75 by ¾ to generate ¾ scaled peak reference signal 60. Peak detected signal 75 is also applied to differential amplifier 32 in automatic gain control circuit 24. ¾ scaled peak reference signal 60, applied to summing amplifier 66, establishes the servo reference for summing amplifier 66.

Filtered demodulated rectified output 56 is also applied to averaging filter 62. Averaging filter 62 generates an output signal, averaged signal 64, whose amplitude is related to the distance servo head 16 is from a predetermined on-track location on servo written portions 18 of magnetic medium 14.

¾ scaled peak reference signal 60 and averaged signal 64 from averaging filter 62 are applied out of phase to summing amplifier 66 to generate servo error signal 68. Servo error signal 68 indicates the degree of misalignment between servo head 16 and on-track location on servo written portion 18 of magnetic medium 14. To generate servo error signal 68, summing amplifier 66 subtracts ¾ scaled peak reference signal 60 from averaged signal 64.

In operation, when the difference between the ¾ scaled peak reference signal 60 and the averaged signal 64 is zero, servo head 16 is on-track and servo error signal equals zero. However, when the difference between the ¾ scaled peak reference signal 60 and the averaged signal 64 is not equal to zero, servo head 16 is off-track and a servo error signal 68 indicating the degree and direction of displacement of the servo head 16 from the on-track position is generated. For example, servo head 16 is extreme off-track in one direction when the difference between the ¾ scaled peak reference signal 60 and the averaged signal 64 is equal to +¼. Servo head 16 is extreme off-track in the opposite direction when the difference between the ¾ scaled peak reference signal 60 and the averaged signal 64 is equal to −¼.

Servo error signal 68 is applied to control electronics 70 to generate control signal 72 in response to servo signal error 68. Control signal 72 is applied to head positioning device 74, which moves tape head assembly 12 in either a first or second direction transverse to motion of magnetic medium 14.

The invention shown in FIG. 1 and described hereinabove is not limited to the single channel format disclosed and may be used in multiple channel formats such as that shown in FIG. 8 and described below.

FIG. 8 is a block diagram of a track following positioning system 120 including two channels, one for the servo head 16 dedicated to the forward read 136 and one for the servo head 17 dedicated to the reverse read 138, according to another embodiment of the invention. Tape head assembly 12 typically consists of a plurality of heads. Each set of heads will typically be configured with a forward read head, reverse read head and write head. The servo error signal will be derived from a reverse read head when reading reverse, a forward read head when reading forward, and from the average of both signals when writing. In operation, forward channel 136 and reverse channel 138 contain symmetrical circuitry and function in the same manner as single channel circuitry shown in FIG. 1 and described above.

As shown in FIG. 8, forward servo head 16 and reverse servo head 17 are connected to multiplexer 130. Multiplexer 130 operates in response to a control signal provided by serial digital interface 132 to select a set of heads in tape head assembly 12 for servoing. A set of heads typically includes a forward read head, reverse read head and write head. Any of the head sets in tape head assembly 12 may be selected as the servo set, with either or both other sets positioned over data track regions of magnetic medium. Multiplexer 130 also operates in response to a control signal provided by serial digital interface 132 to select the proper read head in the selected set when more than one read head is present. Serial digital interface 132 provides control for numerous functions, including control of multiplexer 130 and polarity switching circuitry 134.

For illustrative purposes, the following discussion will assume selection of the forward channel 136 for servo. Forward servo head 16, operatively connected with tape head assembly 12, generates servo head signal 22 in response to the relative position between forward servo head 16 and a predetermined on-track location, such as centerline 106, shown in FIG. 3A. Servo head signal 22 is applied to forward automatic gain control circuit 24 for maintaining forward amplified signal 144 at a constant peak amplitude. The output of forward automatic gain control 24, forward amplified signal 144, is then applied to forward servo demodulator 50.

Forward servo demodulator 50, demodulates forward amplified signal 144 and generates forward servo error signals 148 indicating misalignment of forward servo head 16 on the servo written portions of magnetic medium. Control electronics block 150 receives servo error signals 148 from forward servo demodulator 50 and provides control signals 150 to head positioning device 154 in response to servo error signals 148 generated by forward servo demodulator. In the preferred embodiment, head positioning device 154 is implemented by a step motor in microstep mode used in combination with a micro-positioner.

Figure 9:
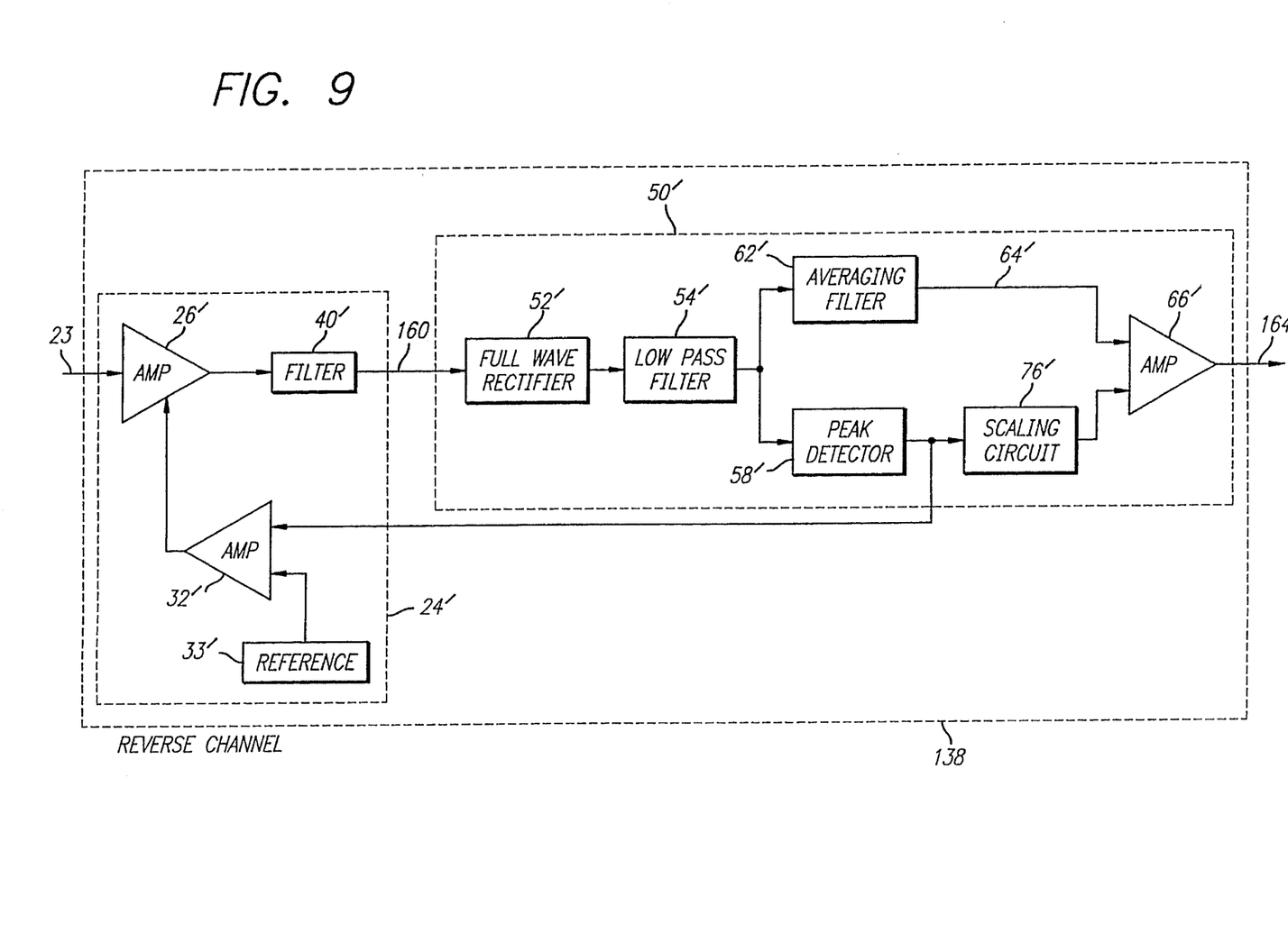
FIG. 9 is a detailed diagram of the reverse channel configuration shown in FIG. 8.

Reverse channel 138 operates in the same manner as forward channel 136. In short, reverse servo head 17, operatively connected with tape head assembly 12, generates servo head signal 23 in response to the relative position between reverse servo head 17 and a predetermined on-track location, such as centerline 108 shown in FIG. 3B. Servo head signal 23 is applied to reverse automatic gain control circuit 24 for maintaining reverse amplified signal 160 at a constant peak amplitude. The output of reverse automatic gain control 24, reverse amplified signal 160, is applied to reverse servo demodulator 50. Automatic gain control circuit 24' and filtered average servo demodulator 50' shown in FIG. 9 include the same components and function in the same manner as automatic gain control circuit 24 and filtered average servo demodulator 50 shown in FIG. 1 and described above. As previously stated, either forward servo head 16 or reverse servo head 17, or both, could be used for servoing in the configuration shown in FIG. 1 Referring to FIG. 9, automatic gain control circuit 24' includes controllable gain amplifier 26', differential amplifier 32', a filter, such as bandpass filter 40' and reference generator 33'. Filtered average servo demodulator 50' includes rectifier 52, lowpass filter 54', peak detector 58', scaling circuit 76', averaging filter 62', and summing amplifier 66'.

Reverse servo demodulator 50 demodulates reverse amplified signal 160 and generates reverse servo error signals 164 indicating misalignment of reverse servo head 17 on servo written portions of magnetic medium. Control electronics block 150 receives reverse servo error signals 164 from reverse servo demodulator 50 and provides control signals 152 to head positioning device 154 in response to reverse servo error signals 164.

The servo error signal will be derived from forward servo head 16 when reading forward, reverse servo head 17 when reading reverse, and from the average of both signals when writing. Control electronics block 150 derives the servo error signal from the correct source. Additionally, due to the nature of the servo patterns, the error signal reverses sense between odd and even numbered tracks. Control electronics block 150 provides switchable phase reversal to insure negative feedback for both cases.

It will be appreciated by persons skilled in the art that the present invention is not limited to what has been shown and described hereinabove, nor the dimensions of sizes of the physical implementation described immediately above. For example, the present invention may be used in other formats and is not intended to be restricted to the forward-reverse format shown. The scope of invention is limited solely by the claims which follow.

What is claimed is:

1. A track following positioning system for maintaining alignment of a tape head on magnetic media comprising:

first servo head means operatively connected to said tape head for generating servo head signals in response to displacement of said first servo head means from an on-track location on a servo written region of magnetic media when said magnetic media is moved in a first direction;

first demodulator means for generating servo error signals in response to said servo head signals generated by said first servo head means indicating misalignment of said first servo head from said on-track location, wherein said first demodulator means further comprises:

first means for generating rectified and filtered signals having values related to said servo head signals;

first means for generating reference signals in response to said rectified and filtered signals;

first means for generating averaged signals related to position of said first servo head means over said servo written region on said magnetic media in response to said rectified and filtered signals; and first means for subtracting said reference signals from said averaged signals to generate said servo error signals; and means for positioning said tape head on magnetic media in accordance with said servo error signals.

2. The system claimed in claim 1 wherein said first means for generating rectified and filtered signals having values related to said servo head signals further comprises:

first rectifier means for generating rectified signals having values related to said servo head signals; and first filtering means for generating filtered signals in response to said rectified signals.

3. The system claimed in claim 2 wherein said first means for generating reference signals in response to said rectified and filtered signals further comprises:

first peak detector means for generating peak detected signals in response to said filtered signals; and means for taking a proportion of said peak detected signals to generate said reference signals.

4. The system claimed in claim 3 wherein said first means for generating averaged signals related to position of said first servo head means over said servo written region on said magnetic media in response to said rectified and filtered signals further comprises:

first average filtering means for generating averaged signals in response to said filtered signals.

5. The system claimed in claim 4, further comprising:

second servo head means operatively connected to said tape head for generating servo head signals in response to displacement of said second servo head means from an on-track location on a servo written region of magnetic media when said magnetic media is moved in a second direction;

second demodulator means for generating servo error signals in response to said servo head signals generated by said second servo head means indicating misalignment of said second servo head means from said on-track location; and means for positioning said tape head on magnetic media in accordance with said servo error signals.

6. The system claimed in claim 5, wherein said second demodulator means further comprises:

second means for generating rectified and filtered signals having values related to said servo head signals;

second means for generating reference signals in response to said rectified and filtered signals;

second means for generating averaged signals related to position of said second servo head means over said servo written region on said magnetic media in response to said rectified and filtered signals; and second means for subtracting said reference signals from said averaged signals to generate said servo error signals.

7. The system claimed in claim 6 wherein said second means for generating rectified and filtered signals having values related to said servo head signals further comprises:

second rectifier means for generating rectified signals having values related to said servo head signals; and second filtering means for generating filtered signals in response to said rectified signals.

8. The system claimed in claim 7 wherein said second means for generating reference signals in response to said rectified and filtered signals further comprises:

second peak detector means for generating peak detected signals in response to said filtered signals; and means for taking a proportion of said peak detected signals to generate said reference signals.

9. The system claimed in claim 8 wherein said second means for generating averaged signals related to position of said second servo head means over said servo written region on said magnetic media in response to said rectified and filtered signals further comprises:

second average filtering means for generating averaged signals in response to said filtered signals.

10. The system claimed in claim 9, wherein said servo error signals are derived form said first servo head means when reading in a first direction and said second servo head means when reading in a second direction.

11. The system claimed in claim 10, wherein said servo error signals are derived from averages of servo error signals from said first servo head means and said second servo head means when writing.

12. The system claimed in claim 11, further comprising:

multiplexer means operatively connected to said tape head means for selecting said first or said second servo head means for servo during a read operation.

13. The system claimed in claim 12, wherein said multiplexer means selects said first and said second servo head means for servo during a write operation.

14. The system claimed in claim 9, further comprising:

controllable gain amplifier means for maintaining said servo head signals at a constant peak amplitude.

15. The system claimed in claim 8, wherein said proportion is ¾.

16. The system claimed in claim 15, wherein said tape head is on-track when said servo error signal equals zero.

17. The system claimed in claim 16, wherein said tape head is off-track when said servo error signal does not equal zero, said servo error signal indicating the degree and direction of displacement of tape head from said on-track location.

18. The system claimed in claim 17, wherein said tape head is extreme off-track in one direction when said servo error signal is positive and has an absolute magnitude equal to ¼ of said reference signal, and is extreme off-track in the opposite direction when said servo error signal is negative and has an absolute magnitude equal to ¼ of said reference signal.

19. The system claimed in claim 4, further comprising:

controllable gain amplifier means for maintaining said servo head signals at a constant peak amplitude.

20. The system claimed in claim 3, wherein said proportion is ¾.

21. The system claimed in claim 20, wherein said tape head is on-track when said servo error signal equals zero.

22. The system claimed in claim 21, wherein said tape head is off-track when said servo error signal does not equal zero, said servo error signal indicating the degree and direction of displacement of tape head from said on-track location.

23. The system claimed in claim 22, wherein said tape head is extreme off-track in one direction when said servo error signal is positive and has an absolute magnitude equal to ¼ of said reference signal, and is extreme off-track in the opposite direction when said servo error signal is negative and has an absolute magnitude equal to ¼ of said reference signal.

24. A method of maintaining alignment of a tape head on magnetic media, comprising the steps of:

generating servo head signals in response to displacement of a first servo head means operatively connected to said tape head from an on-track location on a servo written region of magnetic media when said magnetic media is moved in a first direction;

generating servo error signals in response to said servo head signals generated by said first servo head means indicating misalignment of said first servo head means from said on-track location, wherein said step of generating servo error signals in response to said servo head signals generated by said first servo head means indicating misalignment of said tape head means from said on-track location further comprises the steps of:

generating rectified and filtered signals having values related to said servo head signals by said first servo head means;

generating reference signals in response to said rectified and filtered signals;

generating averaged signals related to position of said first servo head means over said servo written region of magnetic media in response to said rectified and filtered signals; and subtracting said reference signals from said averaged signals to generate said servo error signals; and positioning said tape head on magnetic media in accordance with said servo error signals.

25. The method claimed in claim 24, wherein said step of generating rectified and filtered signals having values related to said servo head signals further comprises the steps of:

rectifying said servo head signals to generate rectified signals; and filtering said rectified signals to generate rectified and filtered signals.

26. The method claimed in claim 25, wherein said step of generating reference signals in response to said rectified and filtered signals further comprises the steps of:

peak detecting said rectified and filtered signals to generate peak detected signals; and multiplying said peak detected signals by a proportion to generate said reference signals.

27. The method claimed in claim 26, wherein the step of generating averaged signals related to position of said first servo head means over said servo written region of magnetic media in response to said rectified and filtered signals further comprises the step of:

average filtering said rectified and filtered signals.

28. The method claimed in claim 27, further comprising the steps of:

generating servo head signals in response to displacement of a second servo head means operatively connected to said tape head from an on-track location on a servo written region of magnetic media when said magnetic media is moved in a second direction;

generating servo error signals in response to said servo head signals generated by said second servo head means indicating misalignment of said second servo head means from said on-track location; and positioning said tape head on magnetic media in accordance with said servo error signals.

29. The method claimed in claim 28, wherein said step of generating servo error signals in response to said servo head signals generated by said second servo head means indicating misalignment of said tape head means from said on-track location further comprises the steps of:

generating rectified and filtered signals having values related to said servo head signals generated by said second servo head means;

generating reference signals in response to said rectified and filtered signals;

generating averaged signals related to position of said second head means over said servo written region of magnetic media in response to said rectified and filtered signals; and subtracting said reference signals from said averaged signals to generate said servo error signals.

30. The method claimed in claim 29, wherein said step of generating rectified and filtered signals having values related to said servo head signals generated by said second servo head means further comprises the steps of:

rectifying said servo head signals to generate rectified signals; and filtering said rectified signals to generate rectified and filtered signals.

31. The method claimed in claim 30, wherein said step of generating reference signals in response to said rectified and filtered signals further comprises the steps of:

peak detecting said rectified and filtered signals to generate peak detected signals; and multiplying said peak detected signals by a proportion to generate said reference signals.

32. The method claimed in claim 31, wherein the step of generating averaged signals related to position of said second servo head means over said servo written region of magnetic media in response to said rectified and filtered signals further comprises the step of:

average filtering said rectified and filtered signals.

33. The method claimed in claim 32, wherein said servo error signals are derived from said first servo head means when reading in a first direction and said second servo head means when reading in a second direction.

34. The method claimed in claim 33, wherein said servo error signals are derived from averages of servo error signals from said first servo head means and said second servo head means when writing.

35. The method claimed in claim 34, further comprising the step of:

selecting said first or said second servo head means for servo during a read operation.

36. The method claimed in claim 35, further comprising the step of:

selecting said first and said second servo head means for servo during a write operation.

37. The method claimed in claim 36, further comprising the step of:

averaging output from said first and said second servo head means to generate said error signal during write operation.

38. The method claimed in claim 32, further comprising the step of:

amplifying said servo head signals by an amount such that said servo head signals are maintained at a constant peak amplitude.

39. The method claimed in claim 31, wherein said proportion is ¾.

40. The method claimed in claim 39, wherein said tape head is on-track when said servo error signal equals zero.

41. The method claimed in claim 40, wherein said tape head is off-track when said servo error signal does not equal zero, said servo error signal indicating the degree and direction of displacement of tape head from said on-track location.

42. The method claimed in claim 41, wherein said tape head is extreme off-track in one direction when said servo error signal is positive and has an absolute magnitude equal to ¼ of the reference signal, and is extreme off-track in the opposite direction when said servo error signal is negative and has an absolute magnitude equal to ¼ of the reference signal.

43. The method claimed in claim 27, further comprising the step of:

amplifying said servo head signals by an amount such that said servo head signals are maintained at a constant peak amplitude.

44. The method claimed in claim 26, wherein said proportion is ¾.

45. The method claimed in claim 44, wherein said tape head is on-track when said servo error signal equals zero.

46. The method claimed in claim 45, wherein said tape head is off-track when said servo error signal does not equal zero, said servo error signal indicating the degree and direction of displacement of tape head from said on-track location.

47. The method claimed in claim 46, wherein said tape head is extreme off-track in one direction when said servo error signal is positive and has an absolute magnitude equal to ¼ of the reference signal, and is extreme off-track in the opposite direction when said servo error signal is negative and has an absolute magnitude equal to ¼ of the reference signal.

* * * * *